US 8,561,413 B2

(12) United States Patent
Taneja

(10) Patent No.: US 8,561,413 B2
(45) Date of Patent: Oct. 22, 2013

(54) SYSTEM FOR POWERING A VEHICLE

(75) Inventor: Dinesh Nath Taneja, Vandalia, OH (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 164 days.

(21) Appl. No.: 12/981,044

(22) Filed: Dec. 29, 2010

(65) Prior Publication Data

US 2012/0167576 A1 Jul. 5, 2012

(51) Int. Cl.
F02C 7/275 (2006.01)
(52) U.S. Cl.
USPC .......................................... 60/788; 60/39.091
(58) Field of Classification Search
USPC .............. 60/39.22, 788, 792, 39.162, 39.163, 60/39.091, 39.1
See application file for complete search history.

(56) References Cited

U.S. PATENT DOCUMENTS

| | | | |
|---|---|---|---|
| 7,170,262 B2 | 1/2007 | Pettigrew | |
| 7,468,561 B2 | 12/2008 | Kern et al. | |
| 7,605,483 B2 | 10/2009 | Kern et al. | |
| 2007/0265761 A1 | 11/2007 | Dooley et al. | |
| 2009/0205341 A1* | 8/2009 | Muldoon | 60/792 |
| 2010/0133813 A1 | 6/2010 | Cote et al. | |
| 2010/0237733 A1* | 9/2010 | Legros | 310/112 |

* cited by examiner

Primary Examiner — Andrew Nguyen
(74) Attorney, Agent, or Firm — Armstrong Teasdale LLP

(57) ABSTRACT

A method and system operating an aircraft system are provided. The gas turbine engine system includes a low-pressure (LP) shaft, a high-pressure (HP) shaft, a constant speed mechanical drive assembly having an input and an output, the input mechanically coupled to the LP shaft, the output mechanically coupled to a constant frequency (CF) electrical generator, and an accessory gearbox assembly having an input and an output, the input mechanically coupled to the HP shaft, the output mechanically coupled to a variable frequency (VF) electrical generator.

20 Claims, 2 Drawing Sheets

SYSTEM FOR POWERING A VEHICLE

BACKGROUND OF THE INVENTION

The field of the invention relates generally to aircraft electrical power generating and distribution systems and more specifically, to a method and system for reducing a potential for a high pressure turbine stall.

At least some known aircraft are driven by two or more high bypass ratio turbofan engines. These engines include a fan driven by a low pressure spool that provides a significant fraction of the overall propulsion system thrust. A high pressure spool drives one or more compressors, and produces additional thrust by directing exhaust products in an aft direction.

In addition to providing thrust to propel the aircraft, and powering the aircraft hydraulic and pneumatic systems, the engines provide electrical power to many aircraft components, including the environmental control system, aircraft computers, hydraulic motor pumps, and/or other motors and electrical devices. One approach to obtaining electrical power from the aircraft engines is to convert some of the rotational mechanical power from the engine to electrical power.

Newer aircraft have smaller engines with more limitations on the high pressure spool power extraction to avoid stalls. Also, the newer aircraft are designed with more electrical loads. Under certain conditions, such as, but not limited to, during the descend condition, sufficient power from the high pressure spool may not be available to support the electrical loads without stalling the compressor. Because the engine stall problem is a relatively new problem, there have been limited attempts to solve it.

BRIEF DESCRIPTION OF THE INVENTION

In one embodiment, a gas turbine engine system includes a low-pressure (LP) shaft, a high-pressure (HP) shaft, a constant speed mechanical drive assembly having an input and an output, the input mechanically coupled to the LP shaft, the output mechanically coupled to a constant frequency (CF) electrical generator, and an accessory gearbox assembly having an input and an output, the input mechanically coupled to the HP shaft, the output mechanically coupled to a variable frequency (VF) electrical generator.

In another embodiment, a method for operating an aircraft system includes starting a turbofan engine by driving a first shaft with a starter/generator, the first shaft being connected between a compressor and a first turbine of the engine, supplying variable frequency (VF) electrical energy to a VF electrical bus using the starter/generator, supplying constant frequency (CF) electrical energy to a CF electrical bus using a generator coupled to a second shaft connected between a fan and a second turbine of the engine, and distributing the variable frequency (VF) electrical energy to aircraft components from the VF electrical bus and the constant frequency (CF) electrical energy to other aircraft components from the CF electrical bus.

In yet another embodiment, an aircraft system includes a gas turbine engine that includes: a compressor coupled to a first turbine through a high pressure (HP) shaft extending between the compressor and the first turbine, a variable frequency (VF) electrical generator, an accessory gearbox assembly having an input and an output, the input mechanically coupled to the HP shaft, the output mechanically coupled to the variable frequency (VF) electrical generator, a fan coupled to a second turbine through a low pressure (LP) shaft extending between the fan and the second turbine and co-axial with the high pressure shaft, a constant frequency (CF) electrical generator, a constant speed mechanical drive assembly having an input and an output, the input mechanically coupled to the LP shaft, and the output mechanically coupled to the constant frequency (CF) electrical generator. The aircraft system also includes a VF bus electrically coupled to said VF electrical generator, said VF bus configured to supply power to a portion of the electrical loads of the aircraft system, and a CF bus electrically coupled to said CF electrical generator, said CF bus configured to supply power to a remaining portion of the electrical loads of the aircraft system.

BRIEF DESCRIPTION OF THE DRAWINGS

FIG. 1 is a schematic cross-sectional diagram of an aircraft gas turbine engine in accordance with an exemplary embodiment of the present invention; and FIG. 2 is a schematic block diagram of an electrical system architecture in accordance with an exemplary embodiment of the present invention.

DETAILED DESCRIPTION OF THE INVENTION

The following detailed description illustrates embodiments of the invention by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an exemplary embodiment, namely, systems and methods of powering an aircraft. However, it is contemplated that this disclosure has general application to electrical system architectures in industrial, commercial, and residential applications.

As used herein, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Embodiments of the present invention provide a new electrical system architecture for aircraft that includes Constant Frequency (CF) AC power obtained from the Low Pressure (LP) spool of turbine engine through a gearbox-Constant Speed Mechanical Drive-Constant Frequency (CF) AC generator, and the Variable Frequency (VF) AC power obtained through the High Pressure (HP) spool of turbine engine driving the accessory gearbox VF Generator. Electrical loads requiring CF power are supplied by the LP spool driven CF generator while the electrical loads which can tolerate VF power are supplied through the HP spool driven VF generator. This architecture, therefore does not require any power electronics based conversion equipment and solves the potential turbine operability/stall issue by maximizing the extracted power through the LP spool of the turbine and minimizing the power extraction from the HP spool of the turbine under the descend mode of the aircraft where the engine stall margin is reduced. Moreover, the HP spool driven generator can also be configured to be a Starter-Generator, for starting the turbine engine.

Figure 1:
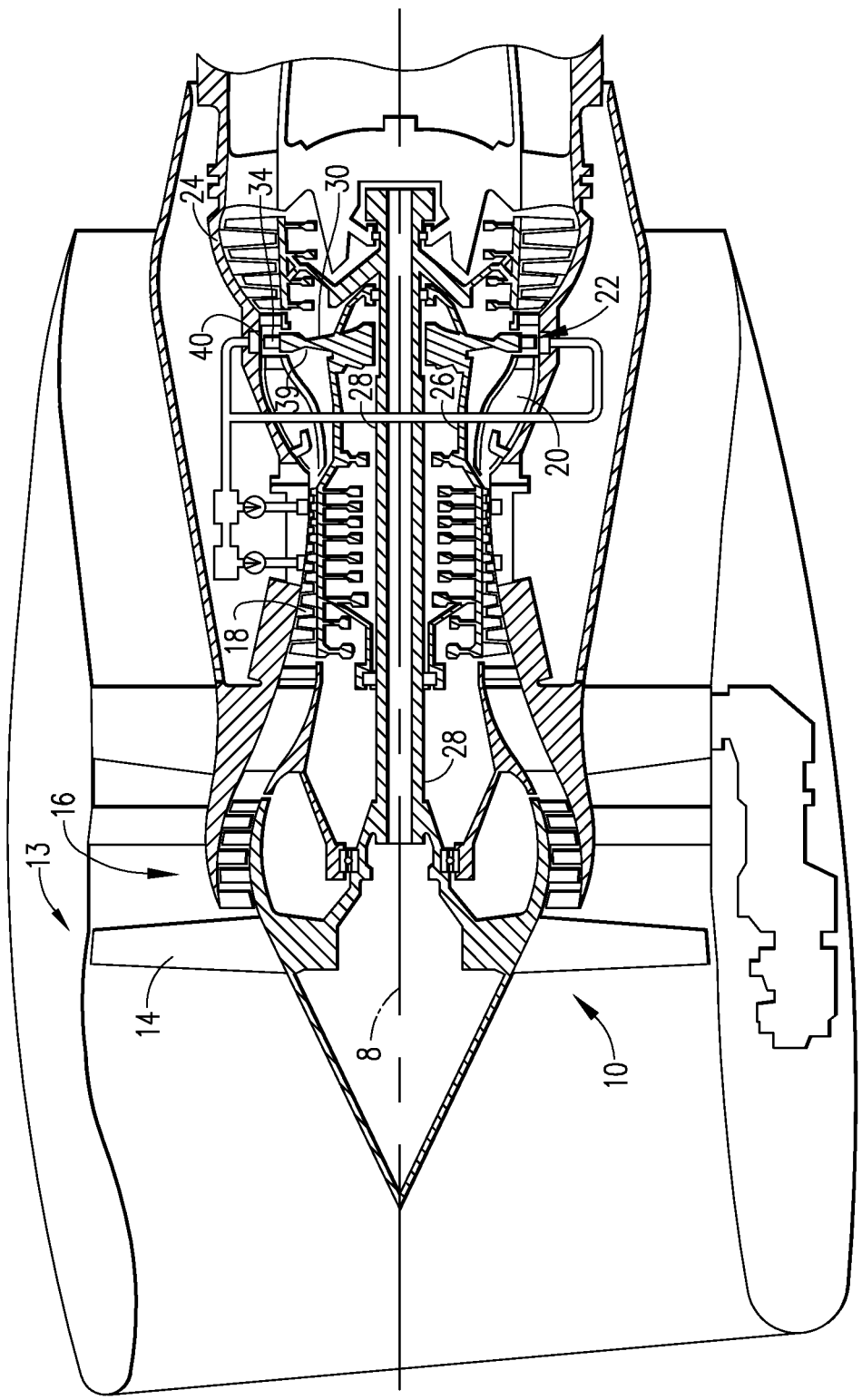
FIGS. 1 and 2 show exemplary embodiments of the method and system described herein.

FIG. 1 is a schematic cross-sectional diagram of an exemplary embodiment of an aircraft gas turbine engine 10 having an engine axis 8, such as a GE CFM56 series engine. Engine 10 includes, in downstream serial flow relationship, a fan section 13 including a fan 14, a booster or low pressure compressor (LPC) 16, a high pressure compressor (HPC) 18, a combustion section 20, a high pressure turbine (HPT) 22, and a low pressure turbine (LPT) 24. A high pressure shaft 26 drivingly connects HPT 22 to HPC 18 and a low pressure shaft 28 drivingly connects LPT 24 to LPC 16 and fan 14. HPT 22 includes an HPT rotor 30 having turbine blades 34 mounted at a periphery of rotor 30. Blades 34 extend radially outwardly from blade platforms 39 to radially outer blade tips.

Figure 2:
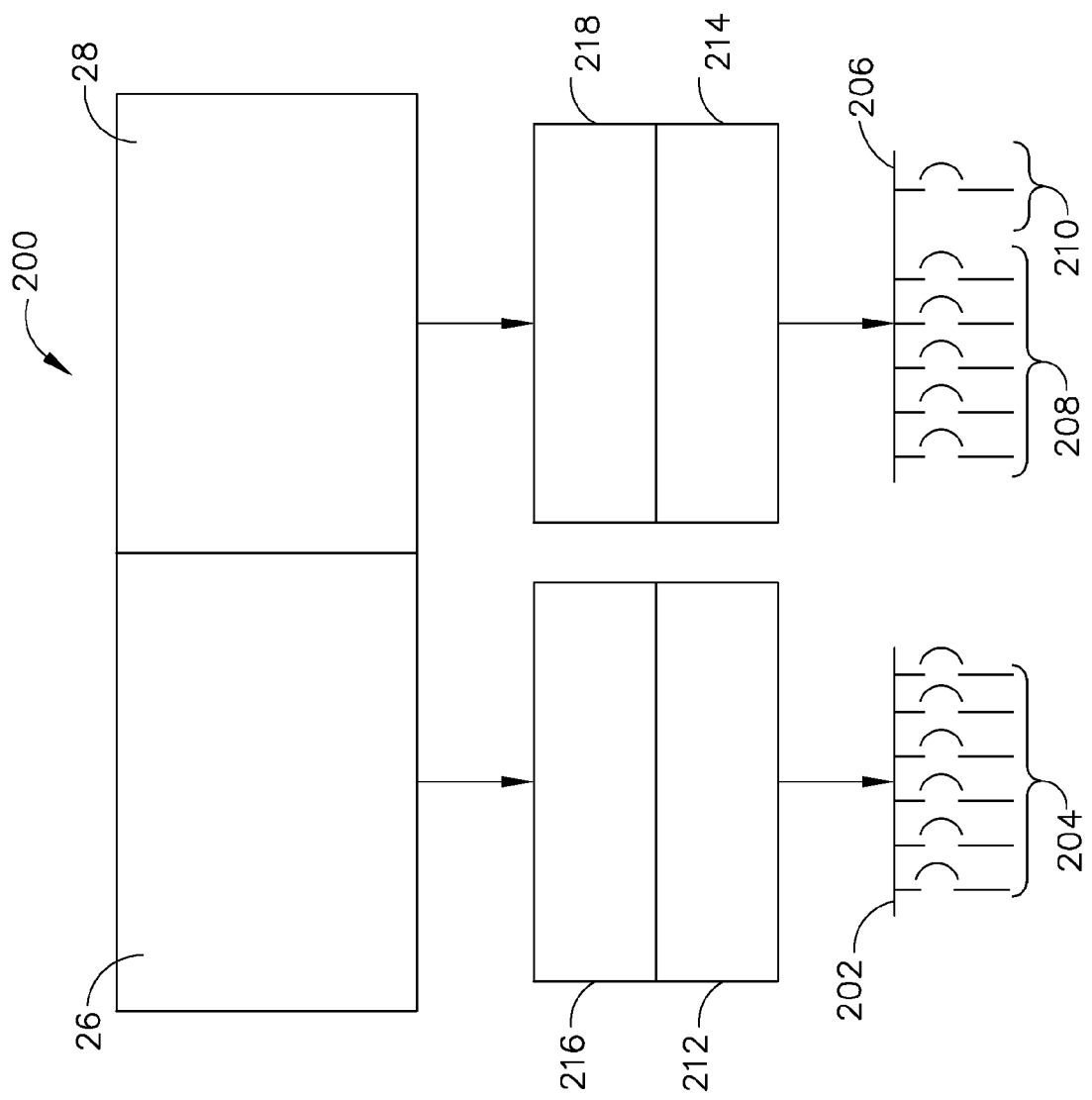

FIG. 2 is a schematic block diagram of an electrical system architecture 200 in accordance with an exemplary embodiment of the present invention. In the exemplary embodiment, electrical system architecture 200 includes a variable frequency electrical bus 202 configured to supply electrical power to a plurality of loads 204 that can tolerate a supply having a variable frequency during operation. Electrical system architecture 200 also includes a constant frequency electrical bus 206 configured to supply electrical power to a plurality of loads 208 that use electrical power having a constant frequency during operation. Constant frequency electrical bus 206 is also configured to supply electrical power to one or more loads 210 that can tolerate a supply having a variable frequency during operation.

Electrical power is supplied to variable frequency electrical bus 202 from a variable frequency electrical generator 212. In various embodiments, variable frequency electrical generator 212 comprises a starter/generator configured to supply a rotational torque to high pressure shaft 26 during a starting process. Electrical power is supplied to constant frequency electrical bus 206 from a constant frequency electrical generator 214. Variable frequency electrical generator 212 is driven by high pressure shaft 26 through an accessory gearbox 216 mechanically coupled between high pressure shaft 26 and variable frequency electrical generator 212. Constant frequency electrical generator 214 is driven by low pressure shaft 28 through a constant speed mechanical drive assembly 218 mechanically coupled between low pressure shaft 28 and constant frequency electrical generator 214.

In the exemplary embodiment, no further conditioning of the VF and CF power is required, for example, the VF and CF power are used on an as is basis without the need for power conversion equipment. Loads requiring CF power for their proper operation are fed from the low pressure shaft 28 driven constant frequency electrical generator 214 whereas the remainder of the loads are powered by variable frequency electrical generator 212.

By maintaining a certain minimum loading on low pressure shaft 28 driven constant frequency electrical generator 214 and minimizing the power extraction from the high pressure shaft 26 driven variable frequency electrical generator 212, a potential stall of the turbine during a descend mode of the aircraft when the engine is operating at or near idle speed to minimize thrust.

Technical advantages of embodiments of the present invention include avoiding use of power conversion equipment is avoided for high pressure shaft 26 driven variable frequency electrical generator 212 because CF power needed for certain loads is obtained from the low pressure shaft 28 driven constant frequency electrical generator 214 and eliminating potential turbine stall under certain operating conditions, for example, during aircraft descend mode by shifting loading from high pressure shaft 26 to low pressure shaft 28. Embodiments of the present invention also provide a lower cost electrical system architecture having a higher efficiency.

The above-described embodiments of a method and system of obtaining aircraft CF power the LP Spool of the turbine by a drive/constant speed generator while VF power is obtained from an HP spool driven generator provides a cost-effective and reliable means for eliminating power conversion equipment for CF power and eliminating stalling of the HP spool by extracting the power from the LP spool. As a result, the method and system described herein facilitate aircraft operations in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A gas turbine engine system comprising:
   a low-pressure (LP) shaft;
   a high-pressure (HP) shaft;
   a constant speed mechanical drive assembly having an input and an output, the input mechanically coupled to the LP shaft, the output mechanically coupled to a constant frequency (CF) electrical generator, said CF electrical generator electrically coupled to a CF electrical bus and configured to supply CF electrical energy to said CF electrical bus; and
   an accessory gearbox assembly having an input and an output, the input mechanically coupled to the HP shaft, the output mechanically coupled to a variable frequency (VF) electrical generator, said VF electrical generator electrically coupled to a VF electrical bus, wherein said VF electrical generator draws a first amount of mechanical energy from the HP shaft, and wherein using said CF electrical generator to supply CF electrical energy to said CF electrical bus reduces the amount of mechanical energy drawn from the HP shaft during a descend mode.

2. A gas turbine engine system in accordance with claim 1, wherein said VF electrical generator comprises a starter/generator configured to turn said HP shaft during an engine startup process and to generate electrical power from the HP shaft during operation after startup.

3. A gas turbine engine system in accordance with claim 1, wherein CF electrical power is supplied to the CF electrical bus directly from said CF generator.

4. A gas turbine engine system in accordance with claim 1, wherein said CF electrical bus and said VF electrical bus are maintained electrically isolated.

5. A gas turbine engine system in accordance with claim 1, wherein a rotational speed of said input of said constant speed mechanical drive assembly varies with a rotational speed of said LP shaft and a rotational speed of said output of said constant speed mechanical drive assembly is substantially constant.

6. A method for operating an aircraft system, said method comprising:
   starting a turbofan engine by driving a first shaft with a starter/generator, the first shaft being connected between a compressor and a first turbine of the engine;
   supplying variable frequency (VF) electrical energy to a VF electrical bus using the starter/generator;

supplying constant frequency (CF) electrical energy to a CF electrical bus using a generator coupled to a second shaft connected between a fan and a second turbine of the engine; and distributing the variable frequency (VF) electrical energy to aircraft components from the VF electrical bus and the constant frequency (CF) electrical energy to other aircraft components from the CF electrical bus, wherein the starter/generator draws a first amount of mechanical energy from the first shaft, and wherein using the CF electrical generator to supply CF electrical energy to the CF electrical bus reduces the amount of mechanical energy drawn from the first shaft during a descend mode.

7. A method in accordance with claim 6, further comprising supplying VF electrical energy to the starter/generator from the VF electrical bus during starting.

8. A method in accordance with claim 6, further comprising coupling an accessory gearbox assembly between the first shaft and the starter/generator.

9. A method in accordance with claim 6, further comprising coupling a constant speed mechanical drive assembly between the second shaft and the generator.

10. A method in accordance with claim 6, further comprising:
    electrically uncoupling at least one load from the VF electrical bus; and
    electrically coupling the at least one load to the CF electrical bus such that a stall of the first turbine is facilitated being reduced.

11. A method in accordance with claim 6, wherein distributing the variable frequency (VF) electrical energy to aircraft components from the VF electrical bus and the constant frequency (CF) electrical energy to other aircraft components from the CF electrical bus further comprises maintaining the VF electrical bus and the CF electrical bus electrically isolated.

12. A method in accordance with claim 6, wherein supplying variable frequency (VF) electrical energy to the VF electrical bus using the starter/generator comprises supplying variable frequency (VF) electrical energy to the VF electrical bus without using an electronic power converter.

13. A method in accordance with claim 6, wherein supplying constant frequency (CF) electrical energy to the CF electrical bus comprises supplying constant frequency (CF) electrical energy to the CF electrical bus without using an electronic power converter.

14. An aircraft system, comprising:
a gas turbine engine that includes:
    a compressor coupled to a first turbine through a high pressure (HP) shaft extending between the compressor and the first turbine;
    a variable frequency (VF) electrical generator;
    an accessory gearbox assembly having an input and an output, the input mechanically coupled to the HP shaft, the output mechanically coupled to the variable frequency (VF) electrical generator;
    a fan coupled to a second turbine through a low pressure (LP) shaft extending between the fan and the second turbine and co-axial with the high pressure shaft;
    a constant frequency (CF) electrical generator; and
    a constant speed mechanical drive assembly having an input and an output, the input mechanically coupled to the LP shaft, the output mechanically coupled to the constant frequency (CF) electrical generator;
a VF bus electrically coupled to said VF electrical generator, said VF bus configured to supply power to a portion of the electrical loads of the aircraft system; and
a CF bus electrically coupled to and configured to receive CF power from said CF electrical generator, said CF bus configured to supply power to a remaining portion of the electrical loads of the aircraft system, wherein said VF electrical generator draws a first amount of mechanical energy from the HP shaft, and wherein using said CF electrical generator to supply CF power to said CF electrical bus reduces the amount of mechanical energy drawn from the HP shaft during a descend mode.

15. An aircraft system in accordance with claim 14, wherein said VF generator further comprises a VF starter/generator, said VF electrical bus configured to supply VF electrical power to said VF starter/generator during a startup process of the gas turbine engine, said VF starter/generator configured to supply power to said VF electrical bus after the gas turbine engine has started up.

16. An aircraft system in accordance with claim 14, wherein CF electrical power is supplied to the CF electrical bus directly from said CF generator.

17. An aircraft system in accordance with claim 14, wherein said CF electrical bus and said VF electrical bus are maintained electrically isolated with respect to each other.

18. An aircraft system in accordance with claim 14, wherein a rotational speed of said input of said constant speed mechanical drive assembly varies with a rotational speed of said LP shaft and a rotational speed of said output of said constant speed mechanical drive assembly is substantially constant.

19. A gas turbine engine system in accordance with claim 1, wherein said VF electrical generator is configured to supply VF electrical energy to said VF electrical bus without using an electrical power converter.

20. An aircraft system in accordance with claim 14, wherein said VF electrical generator is configured to supply VF power to said VF electrical bus without using an electrical power converter.

\* \* \* \* \*